United States Patent [19]
Takamatsu

[11] 3,951,716
[45] Apr. 20, 1976

[54] PROCESS FOR PRODUCTION OF SLIDE FASTENER CHAIN

[75] Inventor: Ikuo Takamatsu, Uozu, Japan

[73] Assignee: Yoshida Kogyo Kabushiki Kaisha, Japan

[22] Filed: Aug. 16, 1974

[21] Appl. No.: 498,119

[30] Foreign Application Priority Data
Sept. 28, 1973 Japan............................ 48-109994

[52] U.S. Cl............................ 156/73.2; 29/207.5 R; 29/408; 156/306; 156/380
[51] Int. Cl.² .................. B32B 31/20; B29C 27/08; B29D 5/00
[58] Field of Search ............. 156/167, 177, 439, 66, 156/73.2, 306, 380; 29/207.5 R, 408

[56] References Cited
UNITED STATES PATENTS

| | | | |
|---|---|---|---|
| 2,212,545 | 8/1940 | Marinsky | 156/66 |
| 2,235,373 | 3/1941 | Kalweit | 156/66 |
| 2,307,410 | 1/1943 | Kuna | 156/66 |
| 3,836,413 | 9/1974 | Frohlich et al. | 156/66 X |
| R25,935 | 12/1965 | Porepp | 156/66 |

Primary Examiner—William A. Powell
Assistant Examiner—Thomas Bokan
Attorney, Agent, or Firm—Bucknam and Archer

[57] ABSTRACT

An elongated stringer tape is fed along a path extending substantially tangentially of a die wheel carrying in its circumferential groove a formed continuous coupling element of a zigzag or helical coil configuration composed of thermally fusible material. The coupling element is held at an elevated temperature by the die wheel. One of the longitudinal edges of the stringer tape becomes received between the shanks of the coupling element as the latter is gradually released from within the die wheel groove, and while the coupling element is partly caught in the groove and is therefore still hot, its shanks are fused to the stringer tape under application of heat and pressure.

2 Claims, 3 Drawing Figures

PROCESS FOR PRODUCTION OF SLIDE FASTENER CHAIN

BACKGROUND OF THE INVENTION

This invention relates to a process for the production of slide fastener chains or stringers. More specifically, the invention is directed to a process for continuously and expeditiously fusing coupling elements in the form of zigzag or helical coils to one of the longitudinal edges of elongated stringer tapes or ribbons.

The technique of unitarily fusing the coupling elements of a thermoplastic synthetic resin or like thermally fusible material to stringer tapes is well known in the art. Usually, however, these coupling elements are so fastened to stringer tapes after having been once withdrawn from the apparatus for forming them. It is therefore difficult to realize the desired uniform pitch of the coupling elements on the stringer tapes, and, moreover, it takes unnecessarily long time to fuse the coupling elements to the stringer tapes after they have been once withdrawn from the forming apparatus.

SUMMARY OF THE INVENTION

It is, therefore, an object of this invention to provide a novel and improved process for the production of slide fastener chains whereby coupling elements can be continuously fastened to stringer tapes at high speed.

Another object of the invention is to provide a process of the character referred to whereby the pitch of the coupling elements on the stringer tapes can be kept uniform throughout the entire length of the latter.

In order to accomplish these objects of the invention, there is provided a process wherein an elongated stringer tape is supplied to a coupling element when the latter is just formed by an element forming apparatus and is held thereby at an elevated temperature. The coupling element is then fused to the stringer tape under application of heat and pressure while being partly held thereby.

The features which are believed to be novel and characteristic of this invention are set forth with particularity in the appended claims. The invention itself, however, together with the additional objects and advantages thereof, will be best understood from the following description of a specific example taken in connection with the accompanying drawings wherein like reference characters denote like parts throughout the several views.

DETAILED DESCRIPTION

Figure 1:
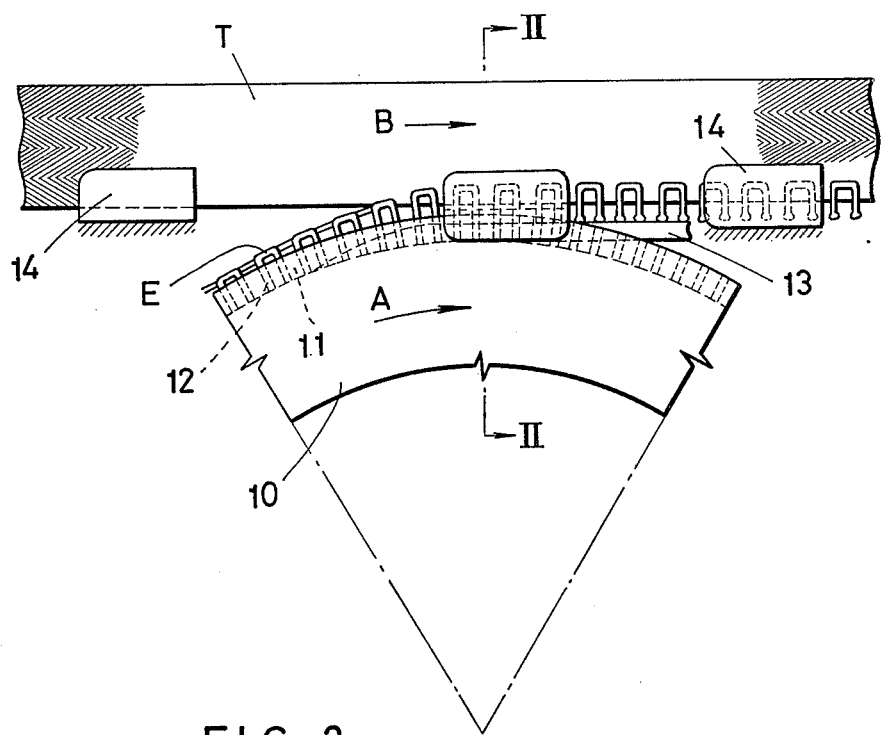
FIG. 1 is a fragmentary top plan view of means adapted for carrying out the process of this invention.

The process of this invention is hereinafter described in more specific aspects thereof with reference to FIGS. 1 and 2 which illustrate the means suitable for use in carrying out the process. The reference numeral 10 in the drawings denotes a rotary die wheel of the known apparatus for forming a continuous coupling element of a zigzag configuration from an elongated filament of a thermoplastic synthetic resin or like thermally fusible material. The die wheel 10 may have a built-in heater, not shown, and is thereby held heated during operation of the apparatus.

Formed on the circumference of the die wheel 10 are rows of teeth 11 with a groove 12 running therebetween for forming the elongated filament into the continuous coupling element E of the desired configuration by hot-working operation in the usual manner. A scraper 13 arranged tangentially of the die wheel 10 has its front end portion slidably received in the groove 12 for gradually releasing the formed continuous coupling element E from the die wheel as the latter is caused to rotate intermittently in the direction of the arrow A in FIG. 1.

An elongated stringer tape or ribbon T is adapted to be fed in the direction of the arrow B along suitable guides 14 in parallel relationship to the scraper 13 with a prescribed spacing therebetween. It may be noted from FIG. 2 that this stringer tape T is arranged in such a plane that one of its longitudinal edges will be received between the upper and lower shanks 15 and 16 of the continuous coupling element E. An ultrasonic horn 17 and an anvil 18 are arranged in registered relationship on opposite sides of the stringer tape T.

Figure 2:
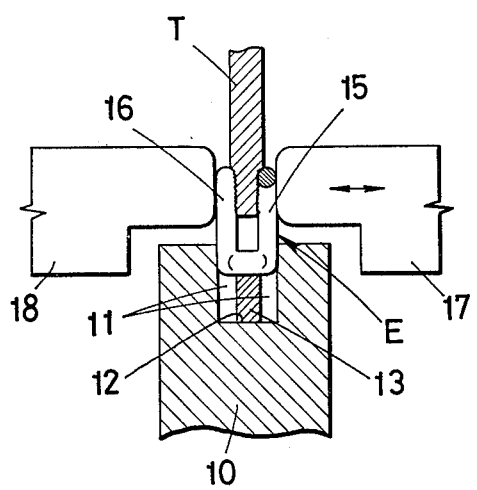
FIG. 2 is a sectional view taken along the plane of line II—II in FIG. 1.

For carrying out the process of this invention in the arrangement explained in the foregoing with reference to FIGS. 1 and 2, the stringer tape T is caused to advance along the guides 14 in timed relationship to the rotation of the die wheel 10. As the formed continuous coupling element E is gradually released from the die wheel 10 by the scraper 13, its upper and lower shanks 15 and 16 receive the said one longitudinal edge of the stringer tape T therebetween. It is considered essential according to this invention that the upper and lower shanks 15 and 16 of the continuous coupling element E should be substantially integrally clamped onto the said one edge of the stringer tape T through application of heat and pressure, as by the ultrasonic horn 17 and anvil 18, while the element is still partly received in the groove 12 of the die wheel 10.

Figure 3:
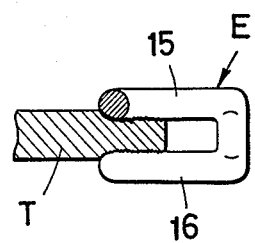
FIG. 3 is a cross sectional view of a completed slide fastener chain.

With the continuous coupling element E thus fused to the stringer tape T while being still held at elevated temperatures, the completed slide fastener chain shown in cross section in FIG. 3 continues to be fed along the scraper 13 and is thereby completely released from the die wheel 10.

While the present invention has been shown and described hereinbefore in very specific aspects thereof, it is understood that all matter disclosed herein is purely by way of example and is not intended to impose limitations upon the invention. For example, the coupling element may be fused onto the stringer tape by means other than the ultrasonic horn 17 and anvil 18. The invention, therefore, should be interpreted broadly and in a manner comprehensive of all such modifications coming within the scope of the following claims.

What is claimed is:

1. A process for the production of a slide fastener chain which comprises providing a die wheel which has a groove formed in its circumference for holding therein a formed continuous coupling element of thermally fusible material at an elevated temperature, said coupling element having spaced-apart upper and lower shanks, feeding a stringer tape along a path extending substantially tangentially of said die wheel while the latter is in rotation in a prescribed direction and with the plane of the tape oriented transversely to the wheel axis of rotation, gradually releasing said coupling element from within said groove of said die wheel to receive one of the longitudinal edges of said stringer tape between the upper and lower shanks of said coupling element, and fusing the shanks of said coupling element to said one longitudinal edge of said stringer tape under application of heat and pressure directed generally normal to the plane of the tape while said coupling element is still being partly held in said groove of said die wheel.

2. In the process for the manufacture of a slide fastener in which a continuous coupling element having spaced-apart shanks is attached to the edge portion of a stringer tape extending between such shanks, the improvement which comprises the steps of passing the continuous coupling element along a curved path, passing the stringer tape along a path tangential to said coupling element path and directed such that the edge portion of the tape passes between those shanks of the coupling element located within a given length portion of the coupling element path, and applying heat and pressure directed transversely to the plane of the tape to fuse said shanks to the tape between them.

* * * * *